United States Patent
Schimschal et al.

(10) Patent No.: US 12,435,626 B2
(45) Date of Patent: Oct. 7, 2025

(54) SYSTEM AND METHOD FOR ACOUSTIC ISOLATORS

(71) Applicant: Baker Hughes Oilfield Operations LLC, Houston, TX (US)

(72) Inventors: Stefan Schimschal, Celle (DE); Anna Swiatek, Celle (DE); Theodorus W. Geerits, Nienhagen (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 408 days.

(21) Appl. No.: 17/869,551

(22) Filed: Jul. 20, 2022

(65) Prior Publication Data

US 2023/0026433 A1    Jan. 26, 2023

Related U.S. Application Data

(60) Provisional application No. 63/223,722, filed on Jul. 20, 2021.

(51) Int. Cl.
*E21B 47/16* (2006.01)
*G01V 1/52* (2006.01)

(52) U.S. Cl.
CPC .............. *E21B 47/16* (2013.01); *G01V 1/523* (2013.01)

(58) Field of Classification Search
CPC . G01V 1/523; G01V 1/44; G01V 1/46; E21B 47/16; E21B 47/01; E21B 47/107; E21B 49/00; E21B 49/08; E21B 17/00; E21B 17/1042; E21B 29/02; E21B 33/12; E21B 33/1285; E21B 33/129; E21B 33/1293; E21B 43/11; E21B 43/26; E21B 47/095; E21B 49/0875; E21B 7/04
USPC .................................................. 181/101–122
See application file for complete search history.

(56) References Cited

U.S. PATENT DOCUMENTS

| | | | | |
|---|---|---|---|---|
| 4,872,526 A | * | 10/1989 | Wignall | G01V 1/523 181/102 |
| 5,229,553 A | | 7/1993 | Lester et al. | |
| 5,728,978 A | | 3/1998 | Roberts et al. | |
| 5,852,587 A | * | 12/1998 | Kostek | G01V 1/52 181/102 |
| 7,334,661 B2 | * | 2/2008 | Pabon | G01V 1/523 181/102 |
| 7,675,814 B2 | * | 3/2010 | Mandal | G01V 1/44 181/105 |
| 8,220,583 B2 | * | 7/2012 | Botting | G01V 1/523 181/102 |

(Continued)

FOREIGN PATENT DOCUMENTS

| | | |
|---|---|---|
| EP | 2875389 A4 | 6/2016 |
| WO | 2006014272 A1 | 2/2006 |

OTHER PUBLICATIONS

International Search Report and Written Opinion issued Nov. 10, 2022 in corresponding PCT Application No. PCT/US2022/037740.

(Continued)

*Primary Examiner* — Forrest M Phillips
*Assistant Examiner* — Joseph James Peter Illicete
(74) *Attorney, Agent, or Firm* — Hogan Lovells US LLP

(57) ABSTRACT

An isolator for an acoustic logging system includes an outer housing surface, a bore, an outer bore surface, and a first isolator feature positioned between the outer housing surface and the outer bore surface to reduce a collar wave transmitted by the acoustic source.

20 Claims, 14 Drawing Sheets

(56) References Cited

U.S. PATENT DOCUMENTS

| | | | |
|---|---|---|---|
| 9,557,435 B2* | 1/2017 | Sugiyama | G01V 3/18 |
| 10,024,992 B2* | 7/2018 | Chang | G01V 1/523 |
| 10,545,255 B2* | 1/2020 | Nguyen | E21B 47/107 |
| 10,585,202 B2* | 3/2020 | Sakiyama | E21B 47/005 |
| 11,180,988 B2* | 11/2021 | Liu | G01V 1/52 |
| 11,840,924 B2* | 12/2023 | Jin | E21B 47/0025 |
| 2003/0052185 A1 | 3/2003 | Arian et al. | |
| 2003/0106739 A1 | 6/2003 | Arian | |
| 2003/0164236 A1 | 9/2003 | Thornton | |
| 2004/0104068 A1 | 6/2004 | Egerev et al. | |
| 2005/0023074 A1 | 2/2005 | Dubinsky | |
| 2008/0149415 A1 | 6/2008 | Botting | |
| 2009/0107757 A1 | 4/2009 | Lindner | |
| 2010/0157741 A1 | 6/2010 | Drumheller | |
| 2013/0170318 A1* | 7/2013 | Valenza, II | E21B 47/107 |
| | | | 367/83 |
| 2013/0313037 A1 | 11/2013 | Arian | |
| 2014/0177391 A1 | 6/2014 | Sugiyama | |
| 2015/0101800 A1 | 4/2015 | Chang | |
| 2015/0136516 A1 | 5/2015 | Chang | |
| 2015/0146501 A1* | 5/2015 | Ratcliffe | G01V 1/44 |
| | | | 367/25 |
| 2015/0293251 A1 | 10/2015 | Kinoshita | |
| 2016/0003960 A1 | 1/2016 | Chang et al. | |
| 2016/0252639 A1 | 9/2016 | Chang et al. | |
| 2018/0245422 A1 | 8/2018 | Fripp et al. | |
| 2020/0256185 A1 | 8/2020 | Liu et al. | |

OTHER PUBLICATIONS

International Search Report and Written Opinion issued Apr. 16, 2020 in corresponding PCT Application No. PCT/US2020/017519.

* cited by examiner

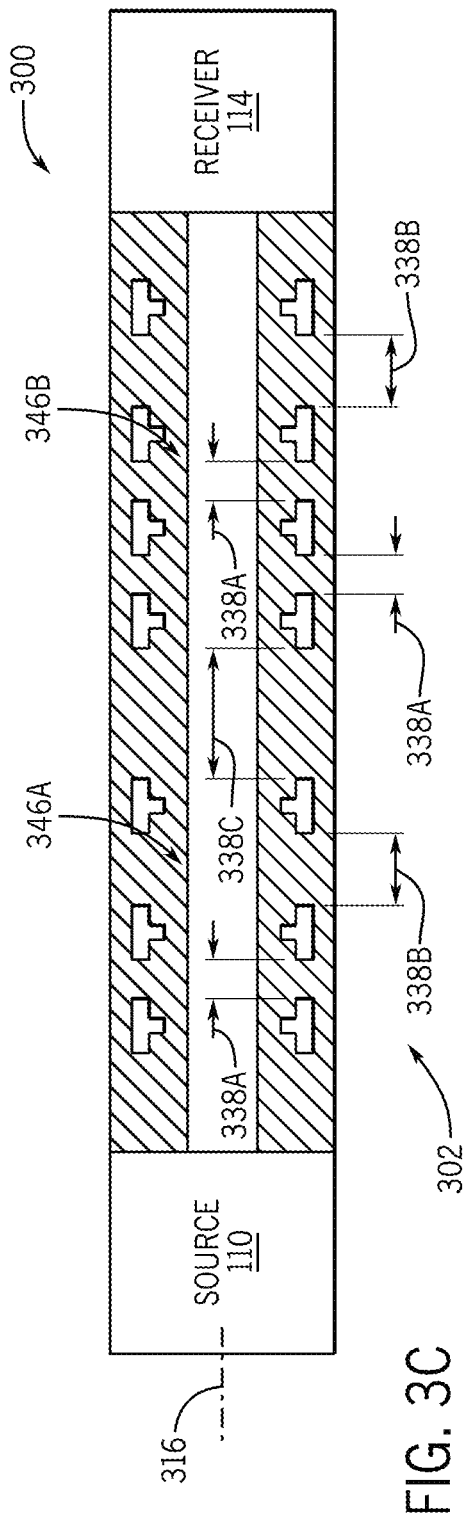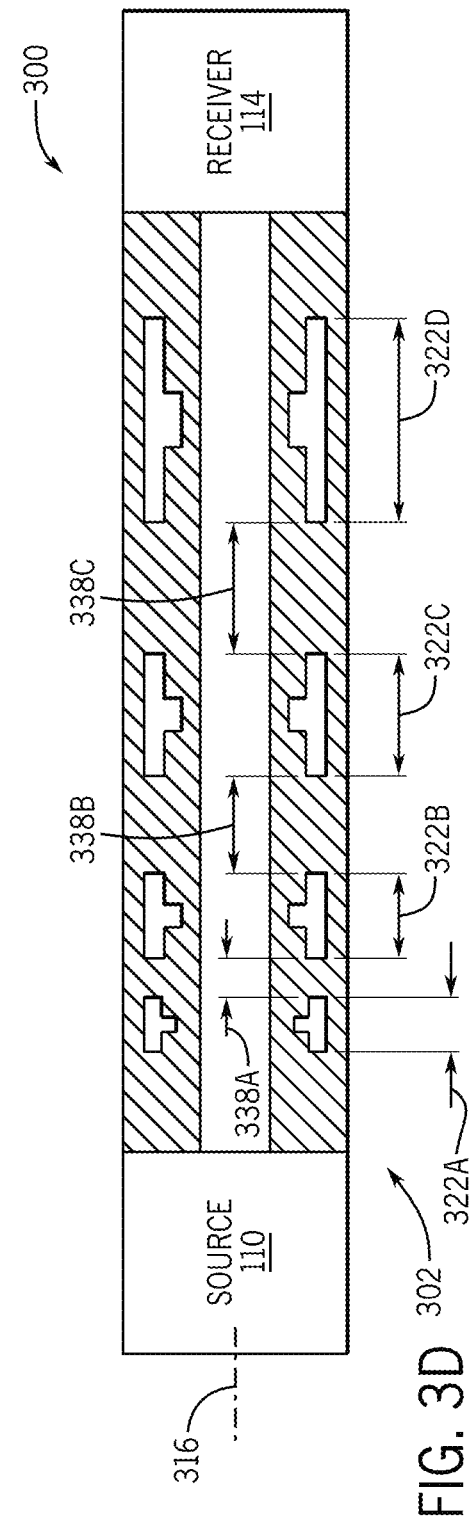

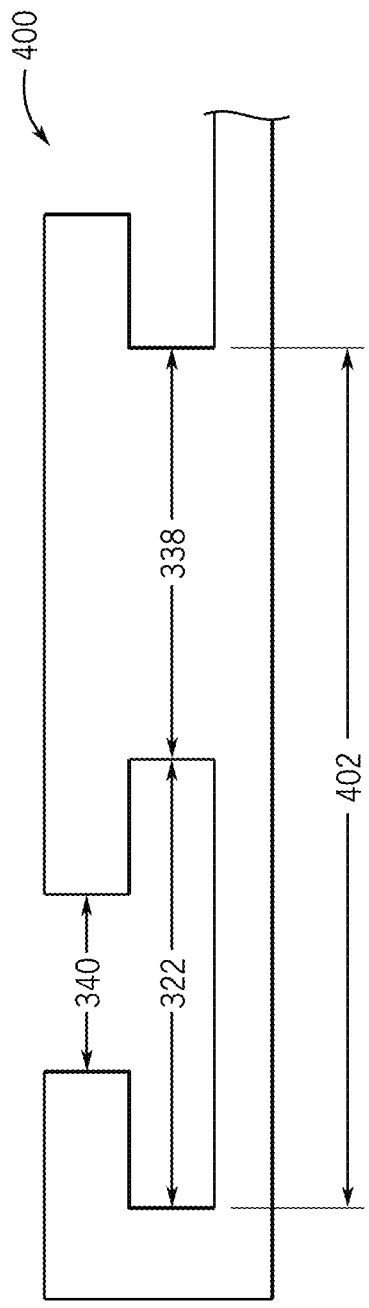
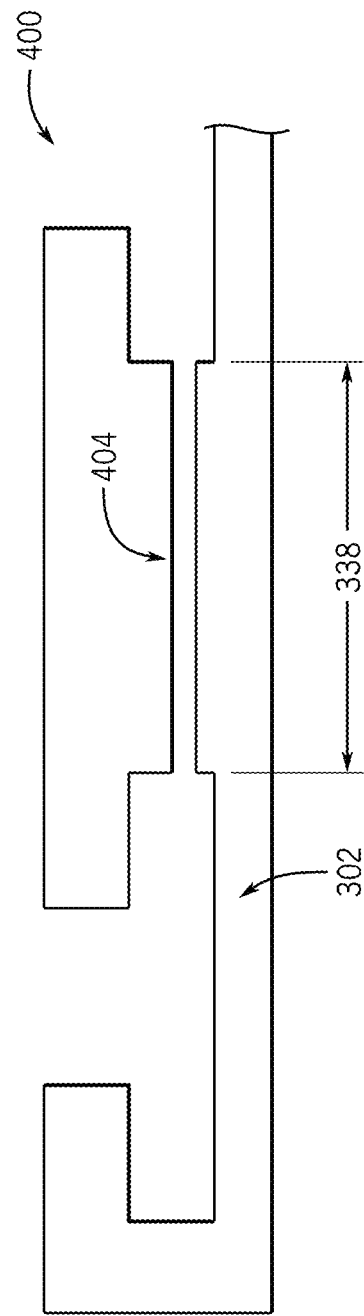
FIG. 4A
FIG. 4B

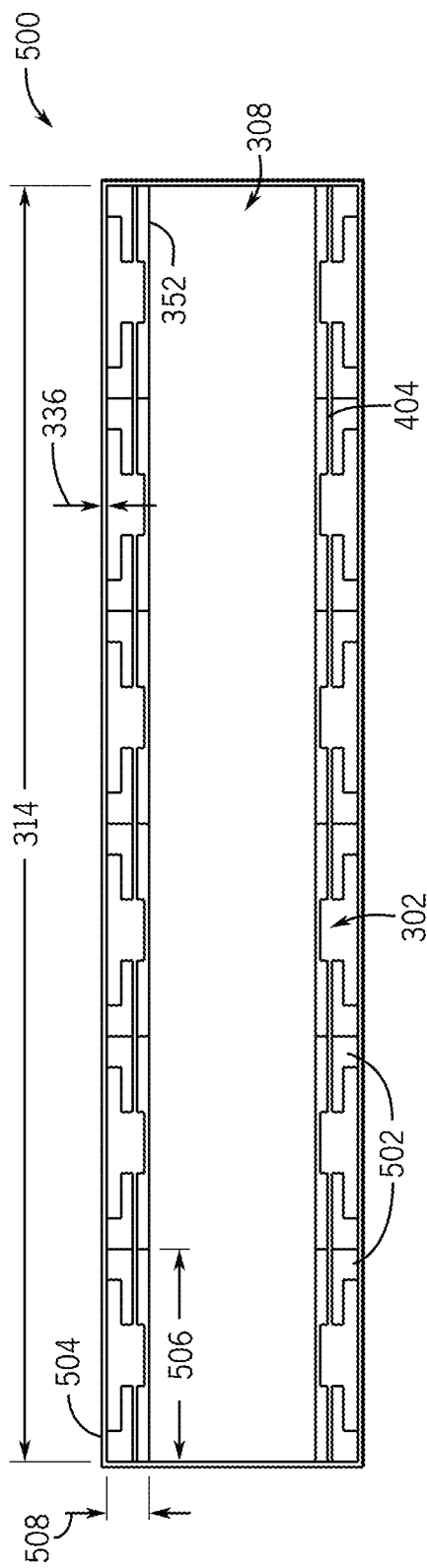
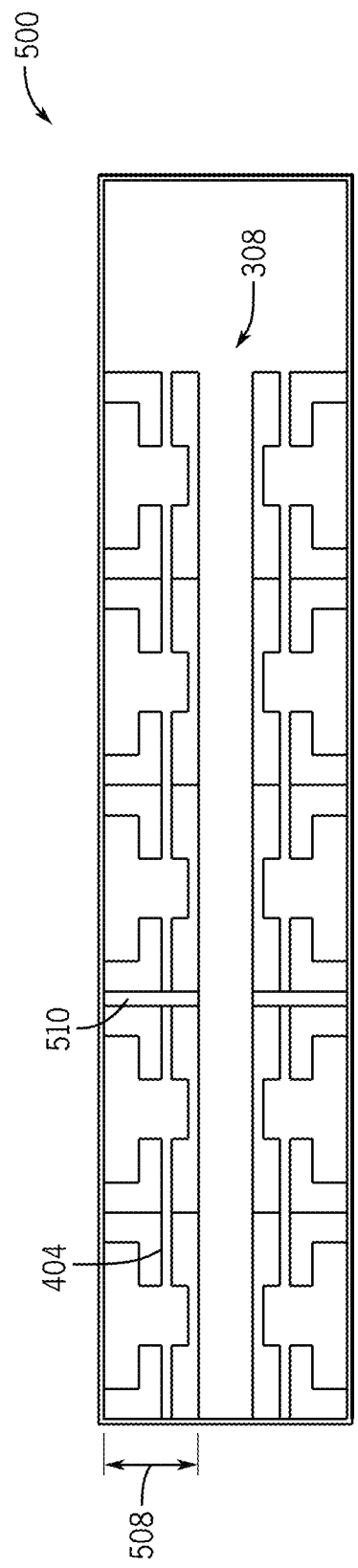
FIG. 5A
FIG. 5B

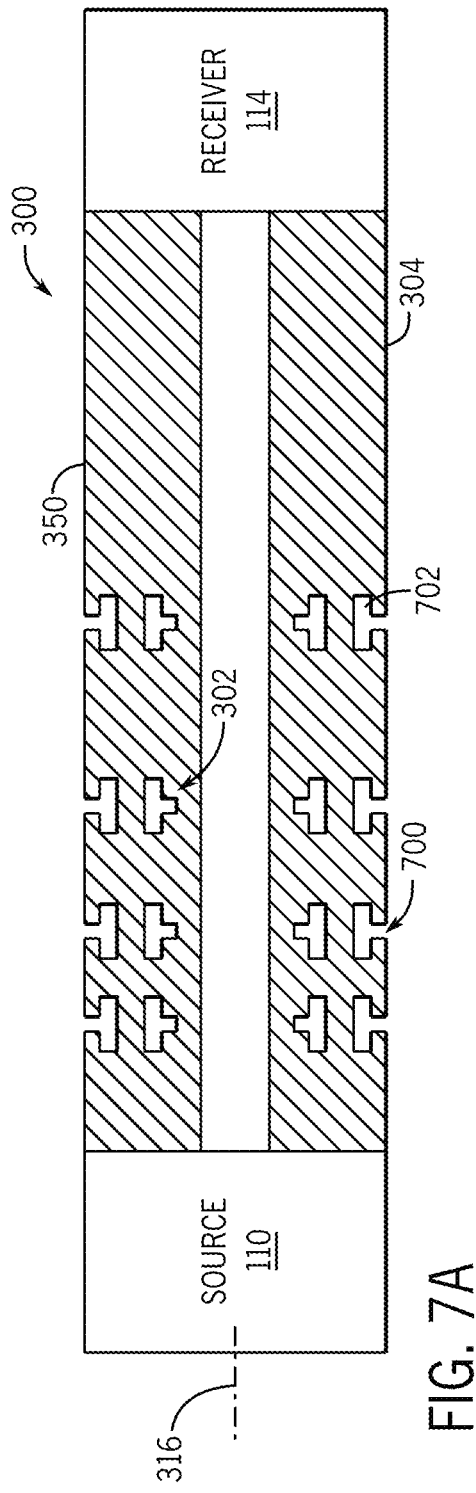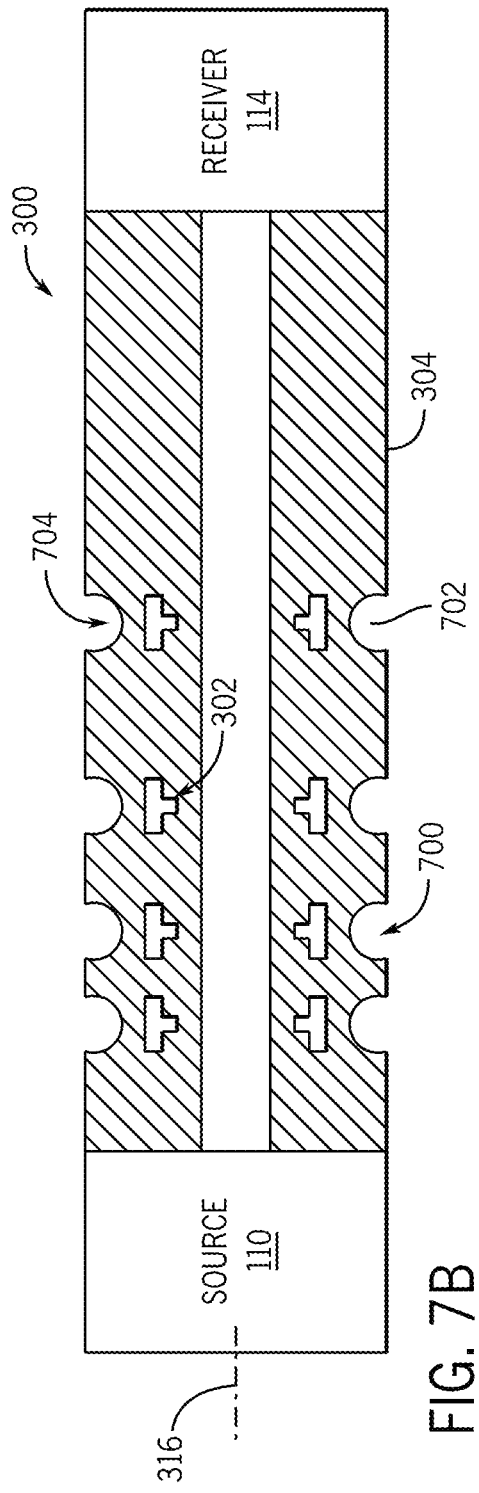
FIG. 7A
FIG. 7B

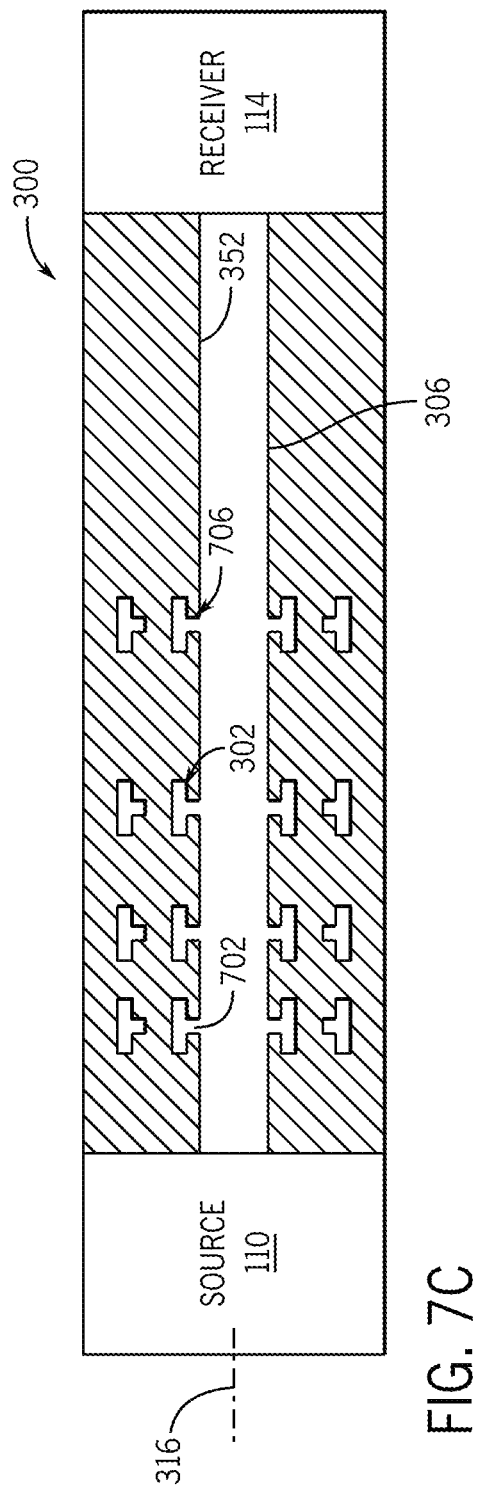
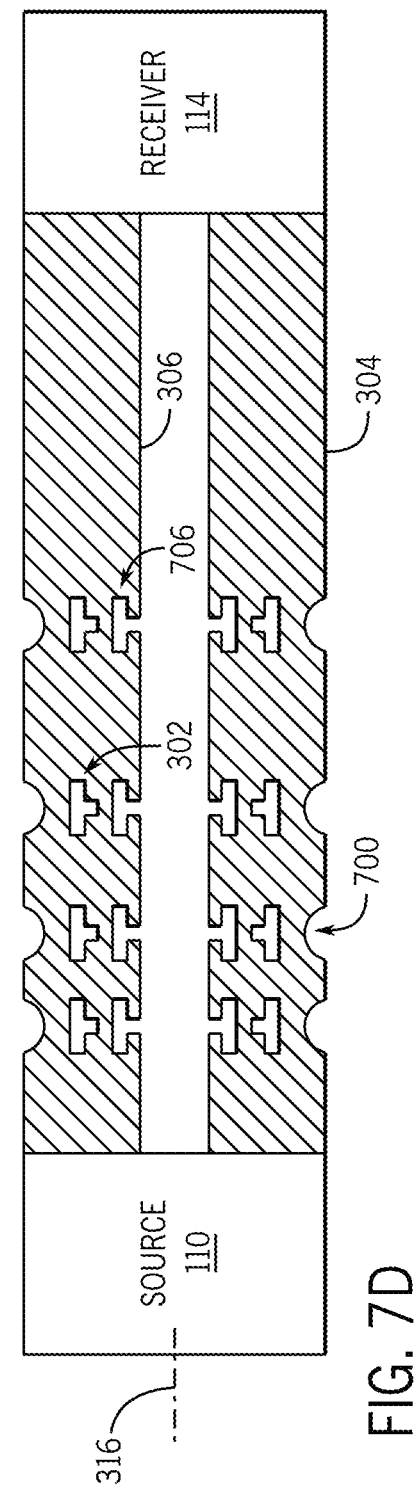
FIG. 7C
FIG. 7D

SYSTEM AND METHOD FOR ACOUSTIC ISOLATORS

CROSS REFERENCE TO RELATED APPLICATIONS

This application claims priority to and the benefit of U.S. Provisional Patent Application No. 63/223,722 titled "SYSTEM AND METHOD FOR ACOUSTIC ISOLATORS," filed Jul. 20, 2021, the full disclosure of which is hereby incorporated by reference in its entirety for all purposes.

BACKGROUND

1. Field of the Disclosure

The present disclosure relates to a system and method for acoustic measurement systems. Specifically, the present disclosure relates to isolators that may be used with acoustic logging systems.

2. Description of Related Art

Oil and gas production may involve downhole measurement operations where various sensors on a downhole tool are utilized to collect data for determining one or more wellbore properties. For acoustic sensing operations, an acoustic transmitter may emit a signal and an acoustic receiver may receive the signal after it gets reflected or refracted from the wellbore. Acoustic waves will travel through a collar of the downhole tool, which could distort measurements, and as a result it is desirable to reduce the influence of those waves.

SUMMARY

Applicant recognized the limitations with existing systems herein and conceived and developed embodiments of systems and methods, according to the present disclosure, for improved acoustic measurement systems.

In an embodiment, an isolator for an acoustic logging system includes an outer diameter, a bore, and a set of isolator features extending along at least a portion of a length of the isolator. The set of isolator features are positioned within an isolator thickness such that the set of isolator features are physically separated from both the bore and the outer diameter. The set of isolator features being aperiodically spaced apart along at least the portion of the length.

In an embodiment, an acoustic logging tool includes an acoustic source for generating one or more acoustic waves, a receiver for receiving at least a portion of or a reflection of the one or more acoustic waves, and an isolator positioned between the acoustic source and the receiver. The isolator includes a plurality of isolator features corresponding to respective removed material sections, the plurality of isolator features increasing a flexibility of the isolator, wherein each isolator feature is separated from an adjacent isolator feature by a space, the space being based, at least in part, on an axial position of respective isolator features with respect to the acoustic source.

In an embodiment, a method includes positioning an acoustic logging tool within a wellbore. The method also includes emitting one or more acoustic waves, using an acoustic source. The method further includes causing, via an isolator, at least one of a stop-band shift, a stop-band width increase, or a decrease in an interfering amplitude. The method also includes receiving, via a receiver, acoustic data corresponding to the one or more acoustic waves.

In an embodiment, an acoustic logging tool for a wellbore includes an acoustic source for generating one or more acoustic waves. The acoustic logging tool also includes an acoustic receiver for receiving at least a portion of or a reflection of the one or more acoustic waves. The acoustic logging tool further includes an isolator. The isolator includes a housing having an outer housing surface. The isolator also includes a bore defined within the housing and configured to conduct a drilling fluid through the isolator, the bore having an outer bore surface. The isolator further includes a first isolator feature positioned between the outer housing surface and the outer bore surface, the first isolator feature configured to reduce a collar wave transmitted by the acoustic source in the acoustic logging system.

In an embodiment, a method for logging a wellbore includes positioning an acoustic logging tool within the wellbore. The acoustic logging tool includes an acoustic source for generating one or more acoustic waves. The acoustic logging tool also includes an acoustic receiver for receiving at least a portion of or a reflection of the one or more acoustic waves. The acoustic logging tool further includes an isolator. The isolator includes a housing in the wellbore, the housing having an outer housing surface. The isolator also includes a bore within the housing configured to conduct a drilling fluid through the isolator, the bore having an outer bore surface. The isolator further includes a first isolator feature positioned between the outer housing surface and the outer bore surface, the first isolator feature configured to reduce a collar wave transmitted by the acoustic source. The method also includes emitting one or more waves, using the acoustic source. The method further includes receiving, via the acoustic receiver, acoustic data corresponding to the one or more acoustic waves.

BRIEF DESCRIPTION OF DRAWINGS

The present technology will be better understood on reading the following detailed description of non-limiting embodiments thereof, and on examining the accompanying drawings, in which:

FIGS. 3A-3D are schematic cross-sectional views of embodiments of acoustic logging tools, in accordance with embodiments of the present disclosure;

FIGS. 4A and 4B are schematic cross-sectional views of embodiments of isolator segments at isolator features, in accordance with embodiments of the present disclosure;

FIGS. 5A-5D are schematic cross-sectional views of embodiments of an isolator, in accordance with embodiments of the present disclosure;

FIGS. 7A-7E are schematic cross-sectional views of embodiments of acoustic logging tools, in accordance with embodiments of the present disclosure;

DETAILED DESCRIPTION

Figure 1:
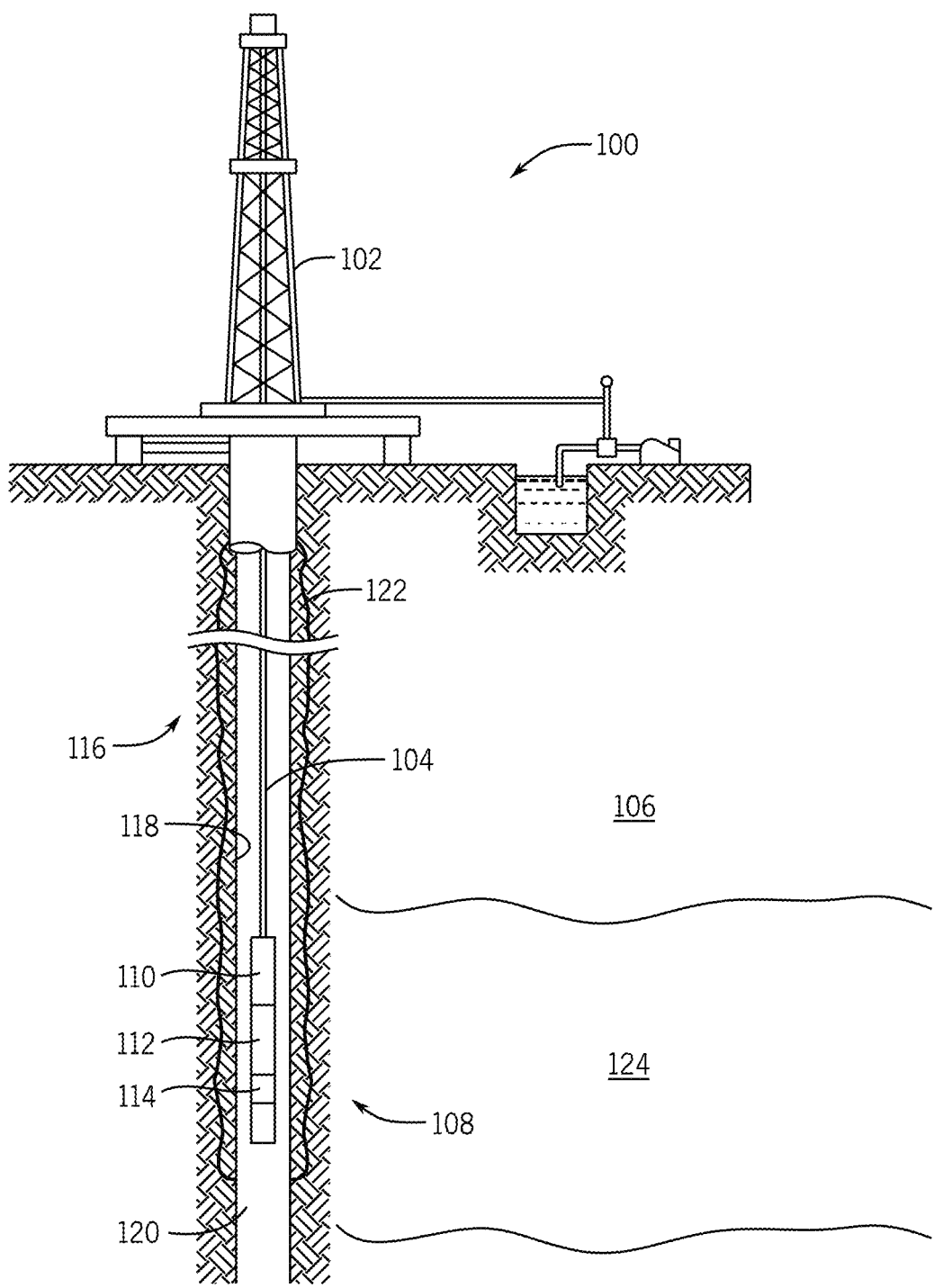
FIG. 1 is a cross-sectional side view of an embodiment of a drilling system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

An acoustic borehole tool may include one or more isolator sections to reduce influences generated by acoustic waves that travel through parts of a drill string, such as a bottomhole assembly, a downhole tool, or a collar. Embodiments of the present disclosure are directed toward one or more acoustic impedance steps located within a drill collar. In the context of this disclosure, an acoustic impedance step is provided if two materials having different acoustic impedances are in contact to each other. Typically, acoustic impedance steps are provided within a material by including chambers, cavities, holes, cuts, cutouts, grooves, shoulders, steps, or recesses commonly referred to as isolator features located within a drill collar, to dampen the collar waves. Isolator features may be filled with a different material, such as a fluid (e.g., oil, drilling fluid also referred to as drilling mud or simply mud, or water) or a gas (e.g. air). Various embodiments of the present disclosure overcome problems with traditional isolators, which may include cuts located on an outside (e.g., into an outer diameter) or an inside (e.g., into an inner diameter) of the collar. In at least one embodiment, systems and methods are directed toward collars that have straight surfaces on the outer diameter or on both the outer diameter and the inner diameter while still functioning as a dampener for acoustic collar waves due to the inclusion of in-wall or inside cuts, which may also be referred to as middle cuts. Straight surfaces on the outer diameter or on the inner diameter have advantages as they help to reduce erosion or wear at the outer or inner diameter that would be created if the surface at the outer or inner diameter would not be straight (e.g. if surfaces would include diameter changes, diameter steps (e.g. shoulders), etc. In addition, modeling shows that middle cut isolator features significantly contribute to the isolator performance when included into the isolator alone or in combination with either inside cuts and outside cuts. Thus, embodiments may further include arrangements of cuts that include inside cuts, outside cuts, middle cuts, or various combinations thereof.

In operation, amplitudes of acoustic waves arriving from a formation may be overshadowed due to higher amplitudes of acoustic waves that travel through the parts of a drill string, such as the bottomhole assembly, a downhole tool, or the collar of a downhole tool. Independent of where exactly these acoustic waves travel through, acoustic waves through the parts of a drill string, such as the bottomhole assembly, a downhole tool, or the collar of a downhole tool are commonly referred to as collar waves or tool waves. This may be particularly evident in high frequency excitations in fast formations, such as formations where the shear wave velocity within the formation is greater than the compressional wave velocity in the borehole fluid. Embodiments of the present disclosure are directed toward an isolator that can dampen the collar waves such that a determination of the compressional slowness is possible in a threshold number of subsurface formations. Moreover, embodiments enable operation to overcome challenges associated with the collar wave for at least two different tool modes that appear at certain frequencies with different amplitudes and slowness values, and as a result, are highly dispersive. Embodiments reduce the two tool modes in the vicinity of the formation arrival in amplitude and amplitude peak position. For example, a simple collar without mechanical deformation will show a so called stop-band, or a frequency range of relatively low collar wave amplitudes between the maxima of the two tool modes. Embodiments of the present disclosure are directed toward widening the stop-band, reducing the collar wave amplitude within the stop-band, and reducing the maximum amplitudes limiting the stop-band.

In at least one embodiment, one or more chambers, cavities, holes, cuts, cutouts, grooves, shoulders, steps, or recesses commonly referred to as isolator features are formed within a body of the collar, such that the isolator features are arranged within a thickness of the body and do not intersect or otherwise cross respective positions of an internal or an external diameter. Embodiments overcome problems with existing systems, such as later and/or overshadowed formation arrivals, e.g. by reflections of borehole guided waves on outer isolator cuts, that can overshadow formation arrivals with weaker amplitudes at later times. In at least one embodiment, in-wall cuts provide good tool mode or collar wave dampening results that are better than or at least equal to outer and inner cut isolators. These in-wall cuts may be arranged aperiodically. That is, an aperiodic cut width may be utilized with one or more embodiments. Moreover, spacing between adjacent cuts may also be aperiodic. In certain embodiments, cuts are T-shaped. In various other embodiments, cuts may have different cross-sectional appearances. Cuts with different cross-sectional appearances may be mixed within a single collar. Various cross-sectional appearance may be symmetrical about one or more axes or may be asymmetrical about one or more axes. In at least one embodiment, cuts are formed by a series of rings that are installed within a tubular, where different ring dimensions are used to build up a mechanical dampening design.

FIG. 1 is a schematic side view of an embodiment of a wellbore system 100 including a rig 102 and a drill string 104 (e.g., tool string) extending into a downhole formation 106. It should be appreciated that while various embodiments may be discussed with reference to the illustrated wellbore system 100, other embodiments may include other wellbore systems that may include wireline tools, coiled tubing, and the like. Accordingly, discussion with reference to drill strings 104 is for illustrative purposes only. For example, in one or more embodiments, systems and methods described herein may be used in other phases of wellbore operations, such as in wireline runs, completion services, and are not limited to drilling. The illustrated drill string 104 is formed from a plurality of tubulars joined together, for example via threads, and extends into the formation 106 to a bottom hole assembly (BHA) 108. In the illustrated embodiment, the BHA 108 includes a plurality of measurement modules, which may also be referred to as subs or tools, such as an acoustic tool comprising an acoustic transmitter 110 or an array of acoustic transmitters (also referred to as acoustic source or array of acoustic sources), an isolator 112, and an acoustic receiver 114 or an array of acoustic receivers. In various embodiments, the BHA 108 may include additional or fewer units, and further, may be utilized to conduct one or more downhole measurement operations. Additionally, it should be appreciated that the drill string 104 may include various other components, which have been removed for simplicity and clarification with the discussion herein. Furthermore, while embodiments may be discussed with reference to drilling operations, in other embodiments the measurements may be conducted during logging periods, intervention periods, and the like.

As illustrated in FIG. 1, in various embodiments a borehole or wellbore 116 extends into the formation 106 and includes a borehole sidewall 118 and an annulus 120 arranged between the BHA 108 and the borehole sidewall 118. In certain embodiments, during formation of the wellbore 116, the drill string 104 may include a drill bit (not shown) that is driven by a drive on surface or downhole to rotate within wellbore 116. In various embodiments, fluid such as drilling mud may be pumped through the drill string 104 and through the drill bit, where the drilling mud may infiltrate the formation 106 in a near-borehole zone 122.

In various embodiments, the BHA 108 may be utilized to determine the location of a recoverable zone 124 within the formation 106 or to determine one or more formation properties that may lead to identification of one or more recoverable zones 124. The recoverable zone 124 may refer to a region of the formation 106 that includes recoverable hydrocarbons. Additionally, while not illustrated in FIG. 1, the wellbore 116 may also be curved or deviated, and not straight, thereby providing additional stresses and strains on the drill string 104.

As will be described below, in one or more embodiments the acoustic source 110 may emit acoustic energy into the formation that is received by the acoustic receiver 114, for example after it travels through the fluid and gets reflected or refracted at the borehole sidewall 118. In operation, the isolator 112 may block or otherwise dampen acoustic waves that travel through one or more portions of the drill string 104, thereby reducing a likelihood that acoustic waves from the formation are overshadowed. Embodiments of the present disclosure are directed toward one or more features that may be integrated into isolators 112 to improve data acquisition using acoustic measurement systems.

Acoustic measurement systems may excite one or more portions to generate one or more acoustic waves, which are transmitted into the formation through the wellbore fluid. Systems may include a variety of different excitation modes, such as a monopole mode (e.g., Stoneley Mode), a dipole mode (e.g., Flexural Mode), and a quadrupole mode (e.g., Screw Mode). Each of these excitation modes may provide unique benefits or challenges. In one or more embodiments, excitation frequencies may be in the range of 2 to 15 kHz, but such ranges are provided by way of example only and are not intended to limit the scope of the present disclosure. By way of example only, while operating in monopole mode, the tool may create a refracted compressional and shear wave, as well as a borehole guided Stoneley wave. During this operational mode, the direct collar waves may have a strong amplitude that overshadows the formation compressional wave that may lead to reduced accuracy for the determination of the corresponding formation compressional wave arrival or does make it even impossible to determine the formation compressional wave arrival. Moreover, the collar waves may be dispersive, traveling over the whole recording time for the tool, which may mask the incoming refracted waves at multiple slownesses.

Figure 2:
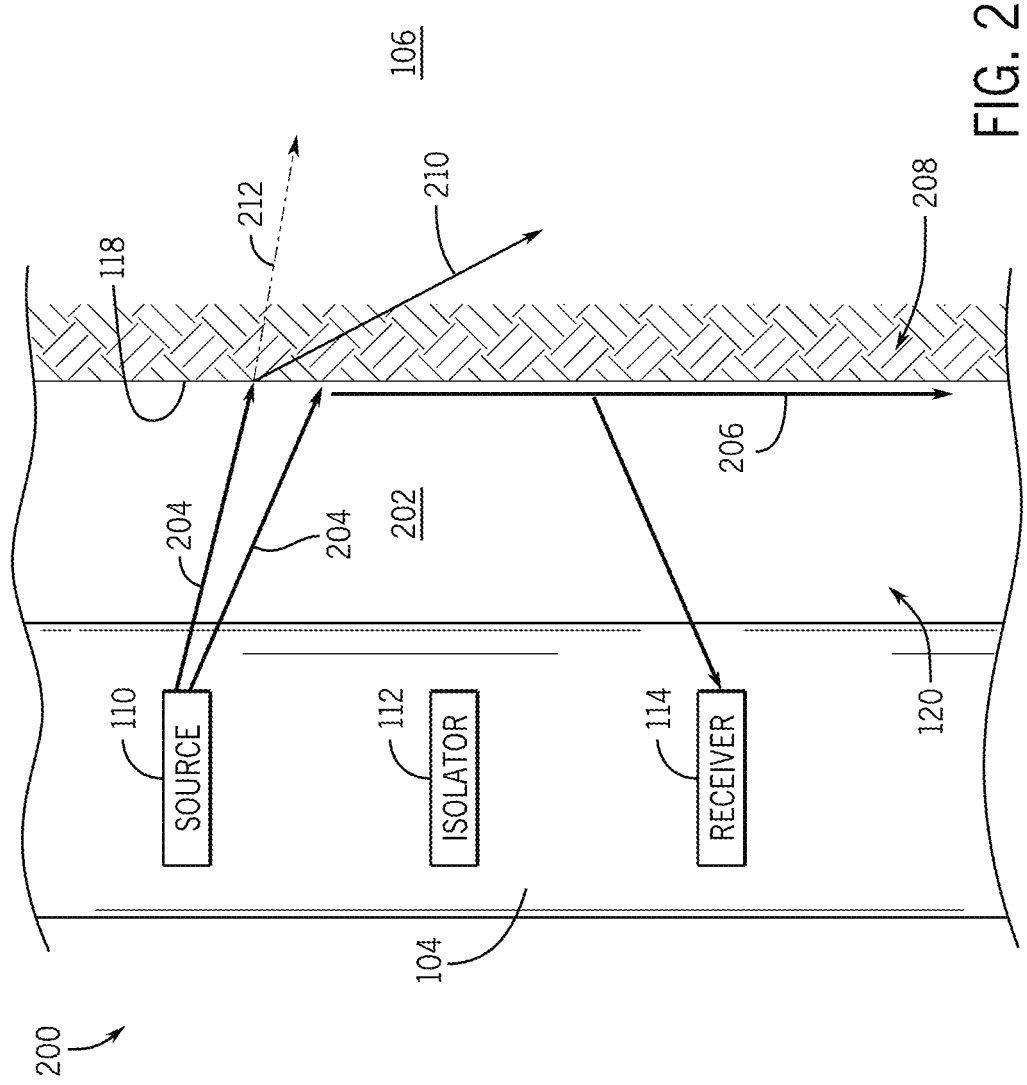
FIG. 2 is a schematic diagram of an embodiment of a downhole environment for acoustic data acquisition, in accordance with embodiments of the present disclosure.

FIG. 2 is a schematic diagram of an example of a downhole data acquisition environment 200 where one or more acoustic measurement systems are utilized to obtain one or more formation properties, for example based, at least in part, on an acoustic signal. In this example, the drill string 104 is arranged within the wellbore (such as wellbore 116), thereby creating annulus 120 which is filled with fluid 202. The acoustic source 110 emits one or more signals 204 (e.g., an acoustic wave) outwardly from the body of the drill string 104. The signal 204 may interact with one or more components, such as the fluid 202, the downhole formation 106, or the borehole sidewall 118. In a fast formation, shear wave slowness will be less than compressional wave slowness of the borehole fluid. In a slow formation, shear wave slowness will be greater than compressional wave slowness of the borehole fluid. Refracted waves traveling along the fluid solid interface (e.g., along the interface between the fluid 202 and the borehole sidewall 118) will be measured.

In this example, an interface signal 206 is measured as it travels along an interface 208 between the fluid 202 and the downhole formation 106, corresponding to borehole sidewall 118. Moreover, at least a portion of the signal 204 extends into the formation, where a fast portion 210 extends at a different angle than a slow portion 212, depending on the formation and fluid properties, according to their refraction indices.

In operation, a collar wave is not a single mode, but rather, a combination of different tool modes. These tool modes are frequency dependent (e.g., dispersive) in amplitude and slowness. The collar wave may have stronger amplitudes than the refracted compressional wave. Additionally, borehole sizes, and formation and fluid properties, may modify the amplitudes in of the tool modes and waves traveling through the wellbore and formation 106.

Figure 3A:
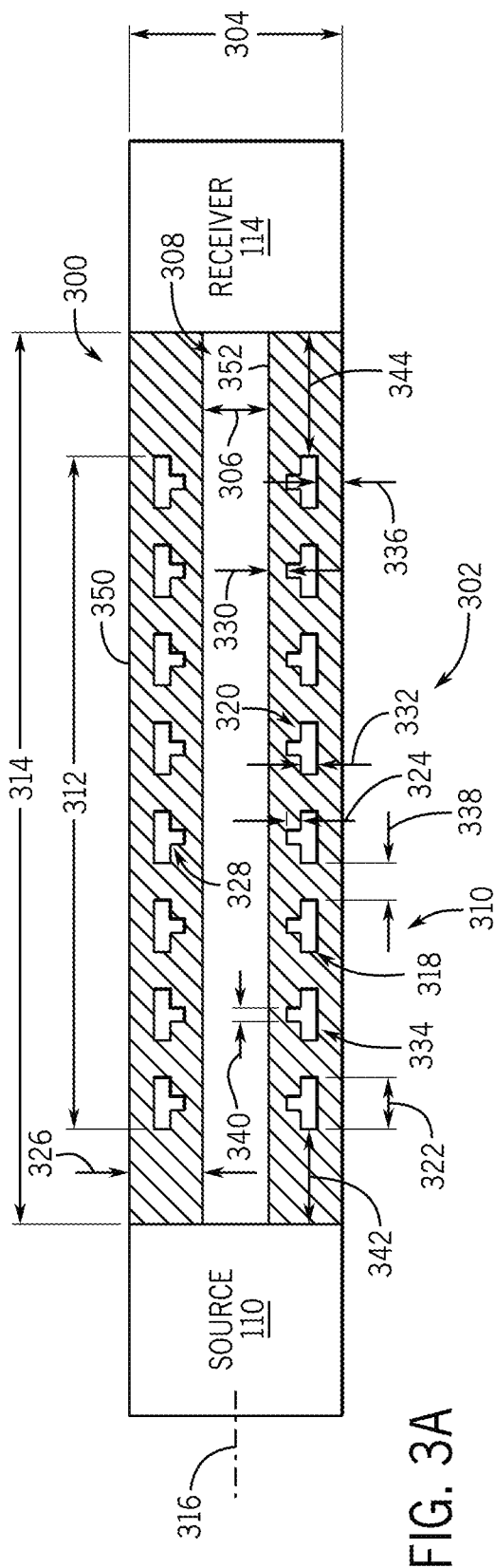

Embodiments of the present disclosure may be directed toward one or more chambers, cavities, holes, cuts, cutouts, grooves, shoulders, steps, or recesses commonly referred to as isolator features positioned within a tool section in order to move a stop-band (e.g., an area of weak collar wave amplitudes between a first tool mode and a second tool mode), to widen a stop-band, or to reduce tool mode amplitudes. Accordingly, systems and methods of the present disclosure are directed toward mechanical features that may improve data acquisition. FIGS. 3A-3D are cross-sectional side views of embodiments of an isolator 300 having middle cut isolator features 302 (e.g., chambers, cavities, etc.), where "middle cut" refers to a position of the isolator features 302 that is between an outer surface 350 of isolator 300 with an outer diameter 304 and an inner surface 352 of isolator 300 with an inner diameter 306, e.g. without contacting or crossing either the outer surface 350 or the inner surface 352. That is, material forming at least a portion of the isolator body and including the isolator features 302 is arranged radially between a bore 308 extending through the isolator 300 and an exterior portion 310 of the isolator 300. In this example, a series of isolator features 302 are arranged along a length 312, which is less than an isolator length 314. It should be appreciated that while eight isolator features 302 are shown in FIG. 3A, that eight is used for illustrative purposes only and there may be more or fewer isolator features 302 in various embodiments of the present disclosure.

In this example, isolator features 302 correspond to T-shaped cut-outs that extend circumferentially about a longitudinal axis 316 of the isolator 300. That is, the cross-sectional appearance and/or "shape" of the isolator features 302 is T-shaped. Independently of the specific "shape" of the isolator features 302, the cut-outs may extend circumferentially about the longitudinal axis 316 by 360° (i.e. by a full revolution, e.g. in a cylindrical symmetric arrangement) or by less than 360° (i.e. one or more segments about the longitudinal axis 316, e.g. one segment about the longitudinal axis 316 by less than 360° such as less than 270°, two segments about the longitudinal axis 316 with one of them by less than 180° such as less than 120°, or three segments about the longitudinal axis 316 with one of them by less than 120° such as less than 90°, etc.). Those skilled in the art, will appreciate that for the isolator 300 to perform, it is required that the summed coverage of the one or more segments about the longitudinal axis 316 needs to be a significant portion (e.g. more than 20° or even 45°. In one or more embodiments, the T-shaped cutouts include an axial section 318 and a radial section 320, where the axial section 318 is substantially parallel to the longitudinal axis 316 and the radial section 320 is substantially perpendicular to the longitudinal axis 316. This arrangement with sections parallel and/or perpendicular to longitudinal axis provides for acoustic impedance steps that are perpendicular to each other. In at least one embodiment, the radial section 320 is substantially centered over an axial section length 322 of the axial section 318. However, it should be appreciated that in one or more embodiments, one or more of the isolator features 302 may be arranged differently such that the radial section 320 is not centered. That is, each of the isolator features 302 may not be the same and may have different dimensions. In other words, the isolator features 302 may not be symmetrical relative to an axis that extends radially through a midpoint of the axial section 318. For example, rather than being T-shaped, the isolator feature 302 may be L-shaped, with a radial section 320. Furthermore, it should be appreciated that while the illustrated embodiment includes the axial section 318 positioned radially outward from the longitudinal axis 316 with respect to the radial section 320, in other embodiments the radial section 320 may be closer to the longitudinal axis 316 than the axial section 318.

As illustrated, the radial section 320 extends for a radial thickness 324, which in this example is less than the axial length 322. The longer extension in axial direction compared to the extension in radial direction is beneficial with respect to the performance of the isolator 300 as well as from the exploitation of the available space for the middle cut isolator features 302. However, it should be appreciated that the radial thickness 324 may be greater than or equal to the axial length 322 in one or more embodiments. Furthermore, the radial thickness 324 and/or the axial length 322 may be tuned as a percentage of the axial length 322 and/or the radial thickness 324, respectively. Accordingly, adjustments or changes to one or more components may also drive additional changes to other components. As shown, the sum of the radial thickness 324 and the radial thickness 332 of the axial section 318 (also referred to as axial section thickness 332) is less than an isolator thickness 326, which corresponds to a wall thickness between the outer surface 350 with outer diameter 304 and the inner surface 352 with inner diameter 306. As will be described below, the isolator thickness 326 may correspond to a combination of a tubular thickness and a ring thickness, for example in embodiments where the isolator features 302 are positioned within a housing, such as a tubular housing or tubular using a set of rings or inserts. In this example, a radial end 328 is spaced apart from the bore 308 by a radial distance 330 (e.g., a first radial distance, a radial section distance, etc.). It should be appreciated that the radial distance 330 may be particularly selected based on one or more operating conditions (e.g. borehole size, transmitted frequency of acoustic source 110, etc.). Furthermore, the radial distance 330 may not be the same for each isolator feature 302. That is, the isolator features 302 may not be aligned and may be positioned closer to or farther from the longitudinal axis 316. Because the radial distance 330 is greater than zero, the isolator features 302 are illustrated as middle cut isolator features that are not fluidly coupled to the bore 308 and are not fluidly coupled to the exterior portion 310 of the isolator 300. Fluidly decoupling the middle cut isolator features from the exterior portion 310 and the bore 308, has advantages as it helps to avoid erosion or wear that would have created otherwise by mud flow through bore 308 and/or through annulus 120. However, it should be appreciated that one or more flow paths may be provided to the bore 308. In other words, in this example the radial sections 320 do not intersect the bore 308.

Further shown in FIG. 3A is an axial section thickness 332, which may be less than, greater than, or equal to the radial thickness 324 of the radial section 320. Additionally, as noted above, the respective thicknesses 332, 324 may be tuned as percentages or at least partially dependent on one another or another measurement. By way of example only, the respective thicknesses 322, 324 may be determined, at least in part, based on the isolator thickness 326. In this example, the radial thickness 324 of the radial section 320 is less than the axial section thickness 332. Furthermore, an axial end 334 is separated from the outer surface 350 with outer diameter 304 by a radial distance 336 (e.g., a second radial distance, an axial section distance, etc.). In one or more embodiments, the second radial distance 336 is equal to the first radial distance 330, thereby centering the isolator feature 302 within the isolator thickness 326. However, it should be appreciated that, in one or more embodiments, various dimensions may be adjusted based on operating conditions (e.g. borehole size, transmitted frequency of acoustic source 110, etc.), and as a result, the isolator feature 302 may be closer to the outer surface 350 or closer to the inner surface 352. Accordingly, because the radial distances 330, 336 may vary, references to a "middle cut" should not be interpreted as positioning the isolator features 302 such that the radial distance 330 and the radial distance 336 are equal.

Figure 3B:
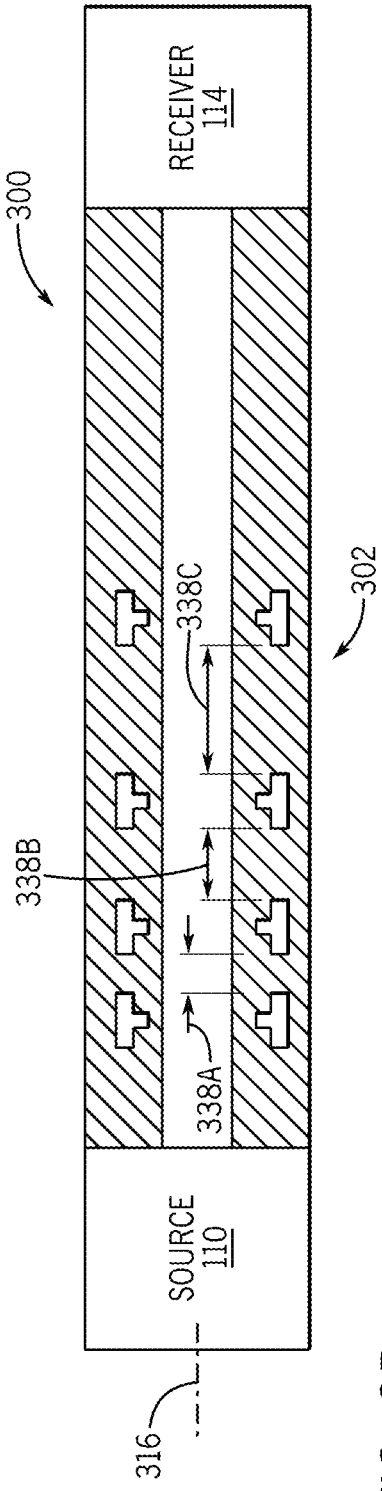

In this example, the isolator features 302 are separated from one another by a space or spacing 338. In one or more embodiments, the space 338 is constant between each isolator feature 302. That is, the space 338 between various isolator features 302 is the same along the length 312. In other words, a function representing the space 338 would be equal to a constant, such as y(x)=1, where regardless of the isolator feature position, the spacing 338 would be the same. That is, the space 338 between various isolator features 302 remains the same along the length 312. It should be appreciated, however, that this is just one example, and the spacing may be modified, for example as shown in FIG. 3B.

The spacings 338 are related to the frequencies that isolator 300 damps or isolates between the acoustic source 110 and the receiver 114. To increase the amount of frequencies (i.e. the spectrum) that isolator 300 damps or isolates, it can be helpful to include different spacings 338 between isolator features 302. By way of example only, spacings 338 may increase between adjacent isolator features 302. For example, over the length 312, each subsequent isolator feature 302 of a set of isolator features may include an additional quantity or amount added to the space 338. This quantity may also increase with subsequent isolator features 302 in the set. As an example, a first spacing for the set may be equal to x, a second spacing for the set may be equal to (x+y) (e.g., the initial spacing distance plus an additional distance), and a third spacing for the set may be equal to (x+2y) (e.g., the initial spacing plus double the additional spacing value) or (x+y+z) (e.g., the initial spacing plus the second spacing, plus another additional spacing value). In this manner, a distance between adjacent isolator features 302 may grow along the length 312. Additionally, in one or more embodiments, isolator features 302 that are closer to the acoustic source 110 may have a larger spacing than isolator features farther away from the acoustic source 110. In this manner, spacing may be considered to be aperiodic in that it may change along the length 312. It should be appreciated that spacings 338 may be based, at least in part, on one or more operating conditions, such as borehole size, transmitted frequency of acoustic source 110, etc. Moreover, in various embodiments, spacings 338 may be tuned or otherwise selected based, at least in part, on other dimensions of the isolator 300. By way of example only, spacings 338 may be selected based at least in part on the isolator length 314, the length 312, and a desired number of isolator features 302. Moreover, in various embodiments, the spacings may be used, at least in part, on a predetermined growth rate for adding distances to the spacing values.

In at least one embodiment, the isolator features 302 further include a radial section length 340, which is an axial extent of the radial section 320 along the longitudinal axis 316. In this example, the radial section length 340 is less than the axial section length 322, thereby providing the T-shape shown in the illustrated embodiments. However, it should be appreciated that these dimensions may change as the cross-sectional shape of the isolator features 302 changes. For example, the radial section length 340 may be equal to the axial section length 322 in embodiments where the isolator features 302 are rectangular. Additionally, as noted above, the radial section length 340 may be greater in embodiments where the "T" is flipped. Moreover, it should be appreciated that one or more curved edges may also be incorporated into the isolator features 302. Additionally, one or more sloped edges may also be incorporated and the "T" shape is being provided as an example. By way of example, an uphole end of the feature 302 may include a slope toward a cavity or valley and then a second, opposite slope, may be on an opposite end of the cavity.

Various embodiments of the present disclosure further include various other particularly selected dimensions, such as a source separation length 342 and a receiver separation length 344, which each correspond to an axial distance between a nearest isolator feature 302. In one or more embodiments, it may be desirable to position the isolators a threshold distance from the respective acoustic source 110 and receiver 114, and as a result, the source separation length 342 and the receiver separation length 344 may be particularly selected based on one or more operating conditions such as borehole size, transmitted frequency of acoustic source 110, or other dimensions, such as the length 314 of isolator 300 and/or a number of isolator features 302 utilized in the isolator 300.

FIG. 3B further illustrates an embodiment of the isolator 300 where the spacing 338 is aperiodic such that a space or spacing 338A between isolator features 302 is less than a space or spacing 338B between isolator features 302, which is less than a space or spacing 338C between isolator features 302, and so forth. That is, in this example, respective spaces 338 increase as the isolator features 302 increase in axial distance from the acoustic source 110. For example, an increase may be applied to each additional isolator feature 302 along the length 312 or an increase may be applied to some additional isolator features 302 along the length 312 followed by a decrease applied to others of the additional isolator features 302. By way of example only, if the space 338A is approximately 90 mm (e.g. between 80 mm and 99 mm), the space 338B may be approximately 100 mm (e.g. between 91 mm and 110 mm, and the space 338C may be approximately 120 mm (e.g. between 110 mm and 130 mm). As a result, the space increased by a greater distance between the second and third isolator features 302 than the first and second isolator features 302. It should be appreciated that a total number of isolator features 302 may decrease as the spaces 338 increase in length if the length 312 is maintained.

FIG. 3C illustrates another embodiment of the isolator 300 where groups 346A, 346B of isolator features 302 may have consistent spacings 338. It should be appreciated certain features have been removed for clarity, but the illustrated isolator features 302 are still at least partially circumferential chambers, cavities, holes, cuts, cutouts, shoulders, or steps, formed within the isolator 300. In this example, a first group 346A includes the spacings 338A, 338B, 338C, where the spacings 338 increase as the isolator features 302 grow in axial distance from the acoustic source 110. However, a second group 346B is only spaced by the space 338A from the last isolator feature of the first group 346A. Thereafter, spacing repeats similar to the first group 346A, with spacing of 338A, 338B, etc. Accordingly, it should be appreciated that the spacing 338 may be aperiodic for different ranges of the length 312, and moreover, that spacing may restart or repeat at various intervals. Accordingly, the spacing 338 may be particularly selected based on one or more design conditions. As noted above, spacing 338 may be based, at least in part, on a variety of factors, such as length 312, length 314, length 322, length 340, or operating conditions such as borehole size, transmitted frequency of acoustic source 110, among other features. Additionally, spacing 338 may be tuned or otherwise dependent, at least in part, on other features, such that an adjustment to one feature may drive an adjustment to spaces 338. By way of example only, if length 314 and length 312 both increase, but a total number of isolator features 302 remains the same, spacing 338 may be adjusted to accommodate the larger axial distance.

FIG. 3D illustrates an example embodiment where both the spacing 338 is aperiodic and the axial section length 322 also increases as the isolator features 302 increase in axial distance from the acoustic source 110. It should be appreciated that such an arrangement is for illustrative purposes, and the axial section length 322 may decrease in one or more embodiments. Moreover, as noted above with respect to FIG. 3C, different groups of isolator features 302 may have different adjustments or changes to various dimensions. In the illustrated embodiment, a first isolator feature 302 has an axial section length 322A and is separated by the space 338A to the second isolator feature 302, which has an axial section length 322B that is greater than the axial section length 322A. Additionally, the space 338B separates the second isolator feature 302 from the third isolator feature 302 and is greater than the space 338A. The axial section length 322C is similarly larger than the axial section length 322B and also the space 338C is larger than the space 338B, and the axial section length 322D is similarly larger than the axial section length 322C. This pattern continues in the illustrated embodiment, as noted above, but may be restricted to groups of particularly selected isolator features 302. In this manner, various adjustments may be made to the isolator features 302 and the isolator 300 in order to increase the stop band and/or reduce interfering amplitudes.

FIG. 4A is a cross-sectional side view of a segment 400 that may form one or more portions of the isolator 300. In this example, various features and dimensions have been removed for clarity with the present discussion. Moreover, it should be appreciated that the illustrated segment 400 may correspond to a mid-cut, similar to the isolator features 302 in FIGS. 3A-3D, but that the illustrated embodiment does not include the interior portions of the ring and/or segment used to form the component. Systems and methods of the present disclosure may be directed toward forming the isolator 300 including one or more cuts or isolator features 302 that include one or more dimensions that may be adjusted to increase a stop-band, shift a stop-band, and/or decrease interfering amplitudes. In one or more embodiments, the isolator features 302 may increase a flexibility of the isolator 300 while maintaining sufficient strength for operation within a wellbore environment. In at least one embodiment, a series of isolator features 302 may be arranged within a section of a tool string, such as a drill string, and may be installed as rings that are positioned within a tubular, integrally formed into the tubular, welded into the tubular, or some combination thereof. Furthermore, it should be appreciated that dimensions may be adjusted to account for operating conditions such as borehole size, bending moment, wellbore trajectory, transmitted frequency of acoustic source 110, among other options.

In this example, the isolator feature 302 of the segment 400 includes the radial section length 340, the axial section length 322, the spacing 338 and a periodicity 402, which in this example is represented as a combination of the spacing 338 and the axial section length 322. In one or more embodiments, one or more of these dimensions, among others, may be adjusted. In at least one embodiment, adjustments are aperiodic such that adjacent isolator features 302 of a set of isolator features 302 have differently sized dimensions. In one or more embodiments, the one or more dimensions may change by a greater amount along the length 312 of a set of isolator features 302, such that isolator features 302 closer to the acoustic source 110 experience a smaller change than isolator features 302 farther away from the acoustic source 110. By way of example only, a first isolator feature adjacent to the acoustic source 110 may have a spacing of 90 mm, a second isolator feature adjacent the first isolator feature may have a spacing of 100 mm, and a third isolator feature adjacent the second isolator feature may have a spacing of 110 mm. Accordingly, the spacing changes by 10 mm between the first and second features but by 20 mm between the second and third features. Such a pattern may be repeated for one or more dimensions, such as the illustrated radial section length 340, the axial section length 322, or the periodicity 402.

It should be appreciated that various other dimensions may also be adjusted, and that the specific dimensions called out in FIG. 4A are by way of example only and are not intended to be limiting. For example, various thicknesses may be adjusted, as well as a relative location of the radial section 320, among other components.

Figure 4C:
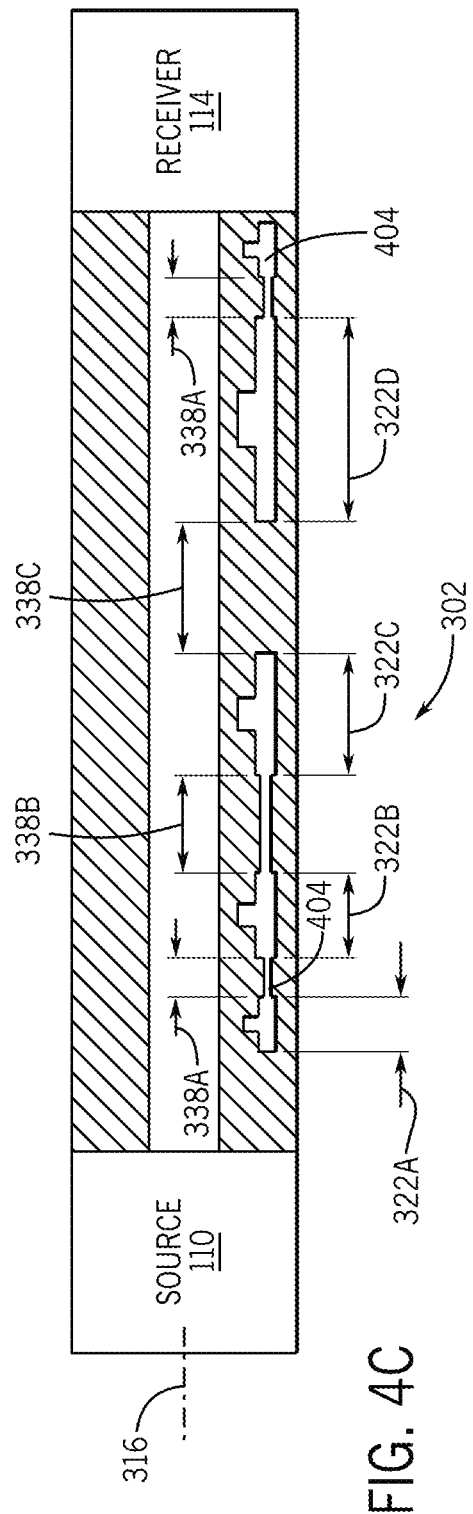
FIG. 4C is a schematic cross-sectional view of embodiments of an acoustic logging tool, in accordance with embodiments of the present disclosure.

FIG. 4B is a cross-sectional side view of an embodiment of isolator features 302 that are coupled together via a flow passage 404. In one or more embodiments, it is desirable to fill the isolator features 302 with material, such as a drilling fluid, oil (e.g. hydraulic oil), or air. This configuration may equalize pressures across the various isolator features 302 within isolator 300. In various embodiments, one or more isolator features 302 are coupled together via the flow passage 404, which extends through the space 338 in the illustrated embodiment. It should be appreciated that each isolator feature 302 may not be coupled together, for example, different sections or groups may be independently coupled together, as illustrated in FIG. 4C. Additionally, while the illustrated embodiments include the flow passage 404 extending between respective axial sections 318, in other embodiments the radial sections 320 may be coupled together via the flow passage 404. Additionally, there may be additional flow passages.

FIG. 5A is a cross-sectional view of an embodiment of an isolator 500 that is formed using one or more rings 502 installed within a tubular 504. Those skilled in the art will appreciate that rings may be one integral part or may be formed by ring segments covering only a portion of the full circumference or may be formed by various separate rings that are coupled to one complete ring 502. Utilizing rings 502 or ring segments is beneficial as it allows to exchange and/or repair rings or ring segments separately in case one ring or ring segment is worn off or otherwise subject to erosion or wear. Exchanging and/or repairing rings or ring segments separately without the need to exchange and/or repair the complete isolator 500 allows for much cheaper maintenance and faster turnaround times of downhole equipment. In this example, the one or more rings 502 include the isolator features 302 or portions of the isolator features 302, and when coupled together, form the isolator 500 that includes the isolator features 302. In one or more embodiments, the rings 502 are circumferential components that are separable and then coupled together within the isolator 500, for example via welding, interlocking components, threads, clamping mechanism, or a compression fit between ends that are welded to the tubular 504 or threaded to BHA subs or tools above and below isolator 500. Rings 502 may as well connected via anti-rotation devices, such as parallel keys, configured to reduce, restrict, or prevent rotational movement of the rings relative to each other and/or the tubular 504 (e.g., due to torsional vibrations). The particular rings 502 are shaped in a way to form a smooth inner surface 352 of bore 308 such that no sharp edge, protrusion, or recess is present at inner surface 352 of bore 308 that may disturb or impact the flow of drilling fluid through bore 308 (for example, the inner surface 352 of bore 308 may have a diameter—e.g. inner diameter 306 of isolator 500—that is substantially constant along length 312 of isolator 500). In this example, the flow passages 404 extend between adjacent isolator features 302 and are connected at the radial sections 320, as opposed to the axial sections 318 as shown in FIGS. 4B and 4C. Flow passages 404 also help to avoid air pockets within the isolator features 302 when isolator 500 is filled (e.g. filled with fluid or gas). As noted above, various features may be adjusted based on operating conditions (such as mud type, sound speed in mud, and transmitted frequency of acoustic source 110). In one or more embodiments, it may be desirable to adjust how the passages 404 couple the isolator features 302 together.

In this example, the rings 502 form the bore 308, however, the tubular 504 forms the second radial distance 336 in this example. As noted above, it should be appreciated that the ring 502 itself may include material forming at least a portion of the second radial distance 336. It should be appreciated that one or more gaskets or seals may be arranged between the rings 502, for example along the flow passages 404 and/or between individual rings 502.

In at least one embodiment, the rings 502 include a ring length 506, which is less than the isolator length 314. Accordingly, in at least one embodiment, multiple rings 502 are utilized to form the isolator 500. It should be appreciated that ring lengths 504 may vary between rings 502, and in certain embodiments, multiple isolator features 302 may be included within a single ring 502. Additionally, a ring thickness 508 is further illustrated, where adjustments to ring thickness 508 may change a size of the bore 308.

Use of the rings 502 may provide for easier installation, components may be machined using traditional equipment and may be installed using traditional techniques, such as welding, clamping, or screwing. Rings 502 may have a thermal expansion coefficient that is similar than the thermal expansion coefficient of tubular 504 to prevent clamping or increased friction when operated in higher temperature environments downhole. In one embodiment, rings 502 are made of the same material than tubular 504. Additionally, the rings 502 may enable tuning of different isolators 500 for different expected environments, where rings 502 may be modular components that are installed within the tubular 504 and can be adjusted and selected for different jobs or different environments. For example, in one or more embodiments, rings 502 may be preconfigured in various sizes and isolator 500 will assembled with a particular ring size according to the size of the borehole where isolator 500 will be deployed. In one or more embodiments, rings 502 may be 3D printed which allows for quick production of small quantities without the need for larger storage capacity. Accordingly, embodiments may be directed toward a modular system that enables rapid installation and repair.

FIG. 5B illustrates a cross-sectional side view of an embodiment of the isolator 500 where the ring thickness 508 is increased, compared to the embodiment of FIG. 5A, which also decreases a size of the bore 308. Further illustrated is a barrier 510 arranged between different rings 502, which blocks flow between the flow passages 404 (e.g. a seal barrier). Alternatively or in addition, spacer (not shown) may be included between rings 502 that prevent direct contact of rings 502 to reduce or avoid wear that may be created by relative movement of rings 502, e.g. relative movement that may be caused by drilling vibration. For example, rubber sheets (not shown) may be utilized as spacer between rings 502. In this manner, each isolator feature 302 may not be coupled together, but rather, sections of isolator features 302 may be coupled together, as noted above. It should be appreciated that the number of isolator features 302 coupled together may be particularly selected based, at least in part, on one or more operating conditions such as borehole size, bending moment, wellbore trajectory, or transmitted frequency of acoustic source 110. Accordingly, different configurations for the isolator 500 may be developed where one or more dimensions are adjusted to account for different expected operating conditions.

Figure 5C:
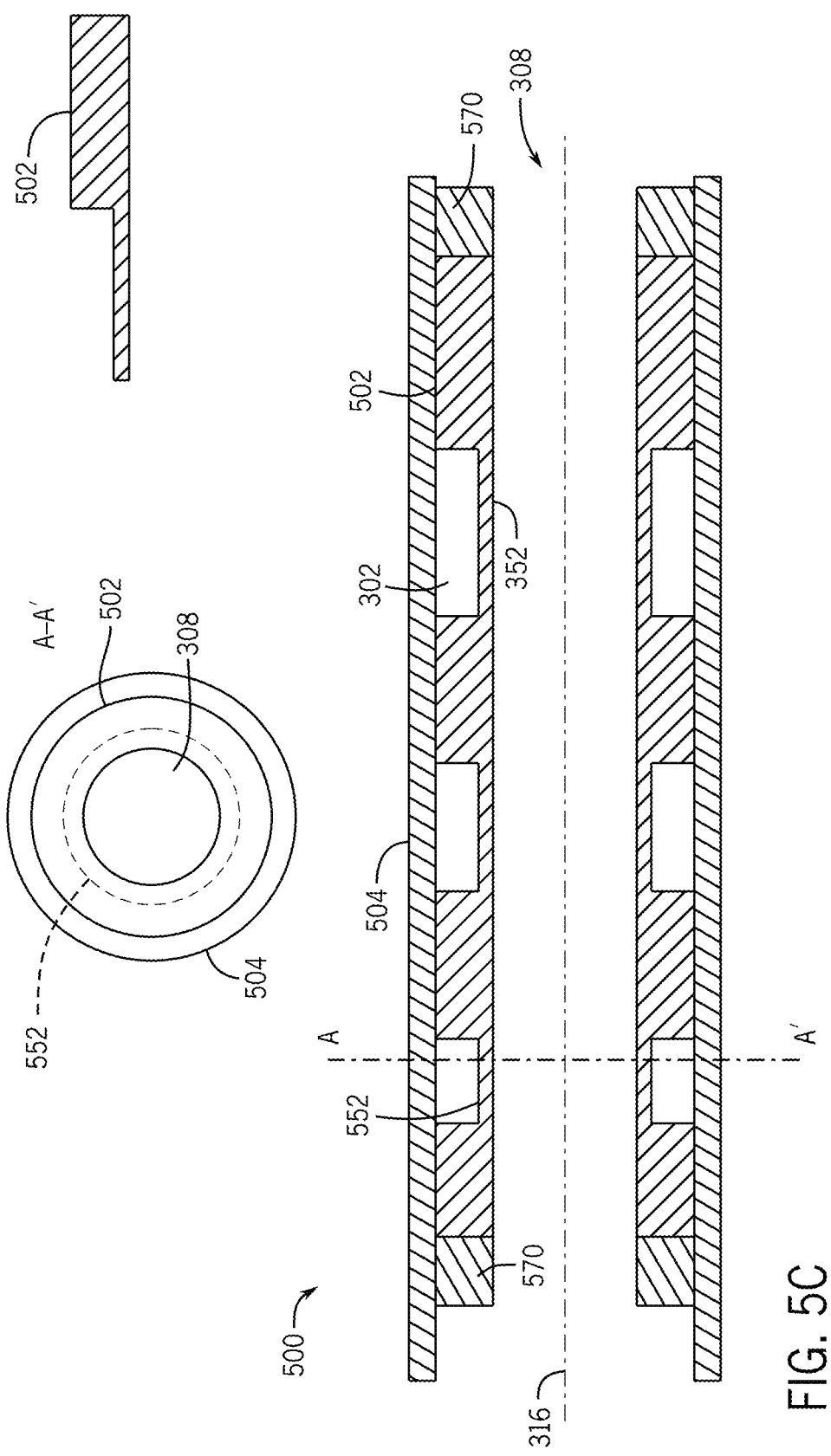
Figure 5D:
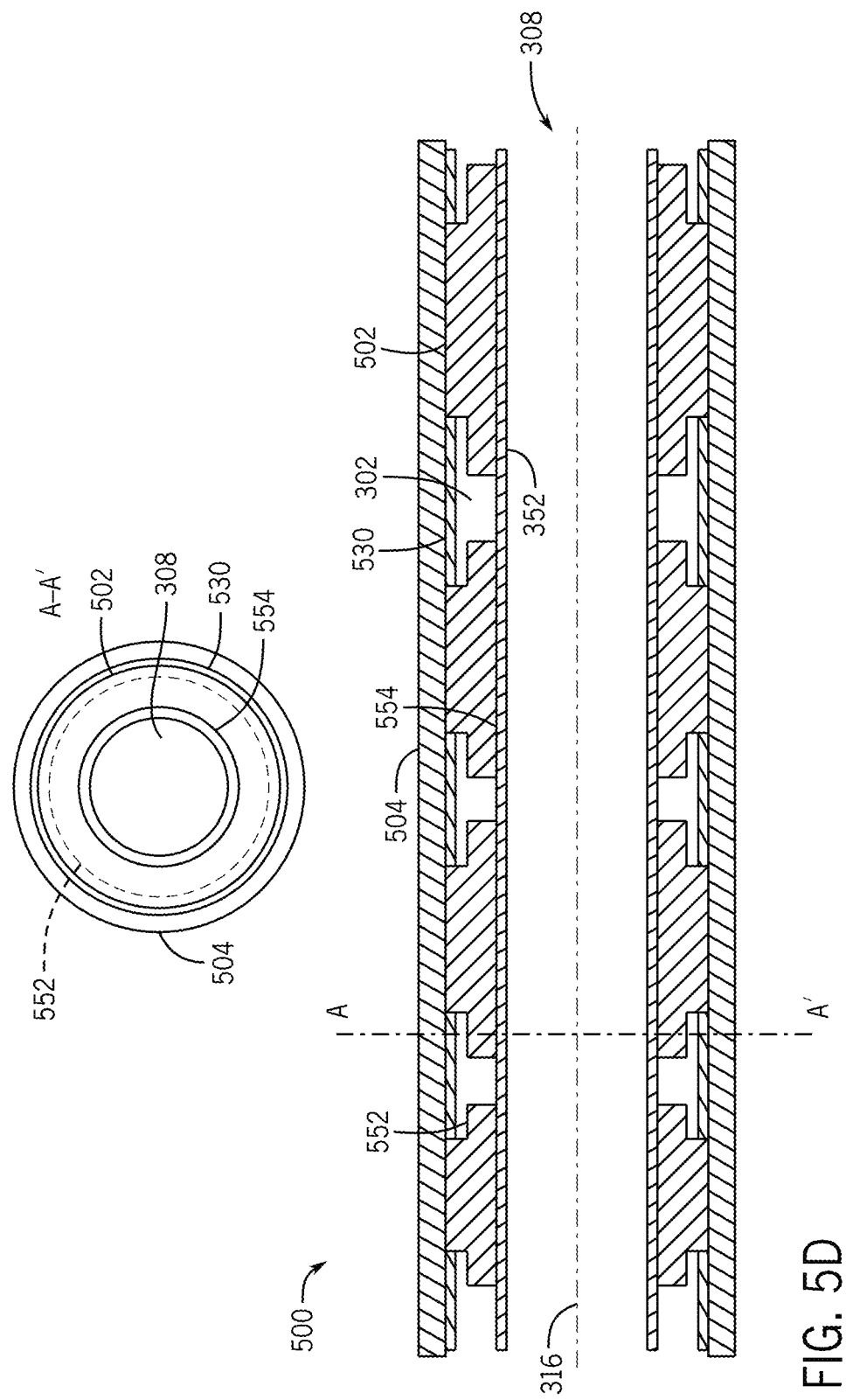

FIG. 5C illustrates a cross-sectional side view of an embodiment of the isolator 500 where the profile of the rings 502 is L-shaped leading to middle cut isolator features 302 that are of rectangular shape. The L-shape of rings 502 provides for step 552 that corresponds to the desired step of acoustic impedances. By joining the L-shaped rings 502 together, and installing them in tubular 504, bore 308 is created with a smooth inner surface 352 of isolator 500. Fastener elements, such as fastener rings 570 may be coupled (e.g. screwed) to tubular 504, such that tubular 504, rings 502 and fastener elements will be held together. FIG. 5D illustrates a cross-sectional side view of an embodiment of the isolator 500 where the profile of the rings 502 is T-shaped leading to isolator features 302 that are T-shaped as well. Rings 502 are separated by distance rings 530 that are arranged and configured to keep rings 502 at a desired distance leading to the desired dimension of isolator features 302. The T-shape of rings 502 provides for step 552 that corresponds to the desired step of acoustic impedances. The T-shaped rings 502 and distance rings 530 are joined together and are installed in tubular 504. A lining or liner tube 554 is installed within the rings 502 that completes the middle cut isolator features 302. Inner surface 352 of lining tube 554 then corresponds to outer surface of bore 308 and inner surface of isolator 500. Fastener elements (not shown), such as fastener rings may be coupled (e.g. screwed) to tubular 504, such that tubular 504, rings 502, distance rings 530, lining tube 554 and fastener elements will be held together.

Figure 6:
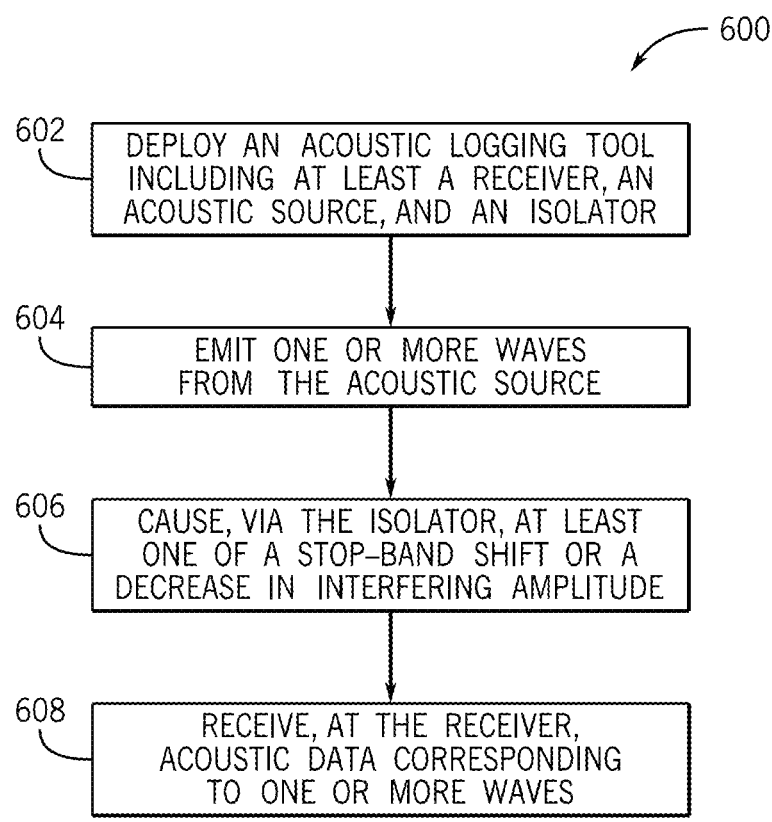
FIG. 6 is a flow chart of an embodiment of a method for downhole acoustic data acquisition, in accordance with embodiments of the present disclosure.

FIG. 6 is a flow chart of an embodiment of a method 600 for acquiring wellbore data using one or more acoustic measurement systems. It should be appreciated that this method, or any method described herein, may include more or fewer steps. Additionally, the steps may be performed in a different order, or in parallel, unless otherwise specifically stated. In this example, one or more acoustic logging tools are deployed into a wellbore 602. In one or more embodiments, the acoustic logging tools include at least one receiver, at least one acoustic source, and at least one isolator. In various embodiments, the isolator may include one or more isolator features, which may correspond to middle cuts, that may be utilized to improve data acquisition, such as by reducing interfering amplitudes or moving a stop-band, among other features. In at least one embodiment, acoustic waves are emitted from the acoustic source 604. As noted above, the acoustic source may operate in a variety of configurations and may emit different types of acoustic waves. Various embodiments further cause, via the isolator, at least one of a shift in a stop-band location or a decrease in an interfering amplitude 606. For example, the one or more middle cuts may be utilized to shift the stop-band, as described herein. Additionally, in embodiments, the receiver may receive acoustic data corresponding to the one or more emitted acoustic waves 608, for example the receiver may receive portions of the acoustic waves or one or more reflections. In this manner, the isolator may be utilized to improve wellbore data acquisition.

FIGS. 7A-7E illustrate cross-sectional side views of embodiments that incorporate the middle cut features 302 with additional cuts or material removals (e.g., chambers, cavities, holes, cuts, cutouts, grooves, shoulders, steps, or recesses) from additional portions of the body of the isolator 300, such as along the inner surface 352, along the outer surface 350, or a combination thereof. By way of example, in various embodiments, different features may be incorporated at different axial locations of the collar, including but not limited to, only middle cuts, only outer cuts, only inner cuts, middle and outer cuts, middle and inner cuts, outer and inner cuts, and a combination of middle, inner, and outer cuts. Accordingly, systems and methods of the present disclosure may be directed toward various combinations in order to improve wellbore data acquisition.

FIG. 7A illustrates an example isolator 300 that includes both the middle cuts 302 and a set of outer cut or outer cut features 700. In this example, the outer cut features 700 are arranged along the outer surface 350 and have a similar shape as the middle cuts 302, but it should be appreciated that the cuts 302, 700 may not have the same shape in all embodiments, as shown in FIG. 7B where the outer cuts 700 are elliptical or circular, which is just one option for outer cuts with rounded edges that may be utilized with embodiments of the present disclosure. In the illustrated example, respective openings 702 of the outer cuts 700 engage the outer surface 350. That is, the outer cuts 700 may be exposed to annulus fluids. It should be appreciated that the sizing and spacing of these outer cuts 700 may share one or more features with the middle cuts 302 described here, such as the aperiodic spacing described above, among other features. Furthermore, while the embodiment illustrated in FIG. 7A shows the outer cuts 700 aligned with the middle cuts 302 (e.g., sharing a common radial axis), it should be appreciated that other embodiments may include offset cuts and the like.

As noted above, FIG. 7B illustrates the outer cuts 700 having an elliptical or curved shape, as opposed to the T-shape of FIG. 7A. It should be appreciated that respective radii 704 of the curved or elliptical cutouts 700 may be particularly selected based on one or more factors, such as a desired depth of the cutout 700, desired spacing, operating conditions (e.g. borehole size, bending moment, wellbore trajectory, transmitted frequency of acoustic source 110 etc.), and the like.

FIG. 7C illustrates an example that includes inner cuts 706, which correspond to cuts where the opening 702 interacts with the inner surface 352. In this example, both sets of cuts 302, 706 are oriented in a similar direction (e.g., the center portion of the "T" is pointed toward the longitudinal axis 316), but it should be appreciated that alternative arrangements may be utilized in various embodiments. As noted above, various dimensions, locations, spacing, and the like may also be particularly selected, and in embodiments the inner cuts 706 and the middle cuts 302 may not be the same size or arranged in alignment, as shown in FIG. 7C.

FIG. 7D illustrates an example that includes inner cuts 706, outer cuts 700, and middle cuts 302. The illustrated outer cuts 700 are elliptical, but it should be appreciated that various other shapes may also be utilized with the scope of the present disclosure. Furthermore, as indicated, spacing, sizing, and location may also vary. For example, various cuts may be larger than other cuts, may have offset spacing, may include more numbers, and the like. By way of example, there may be two outer cuts to every middle cuts. As another example, there may be outer cuts arranged at ever third inner cut. Accordingly, positioning of the cuts may be particularly selected based on operating conditions (e.g. borehole size, bending moment, wellbore trajectory, transmitted frequency of acoustic source 110, etc.) in order to enhance or otherwise select a stiffness of the collar.

Figure 7E:
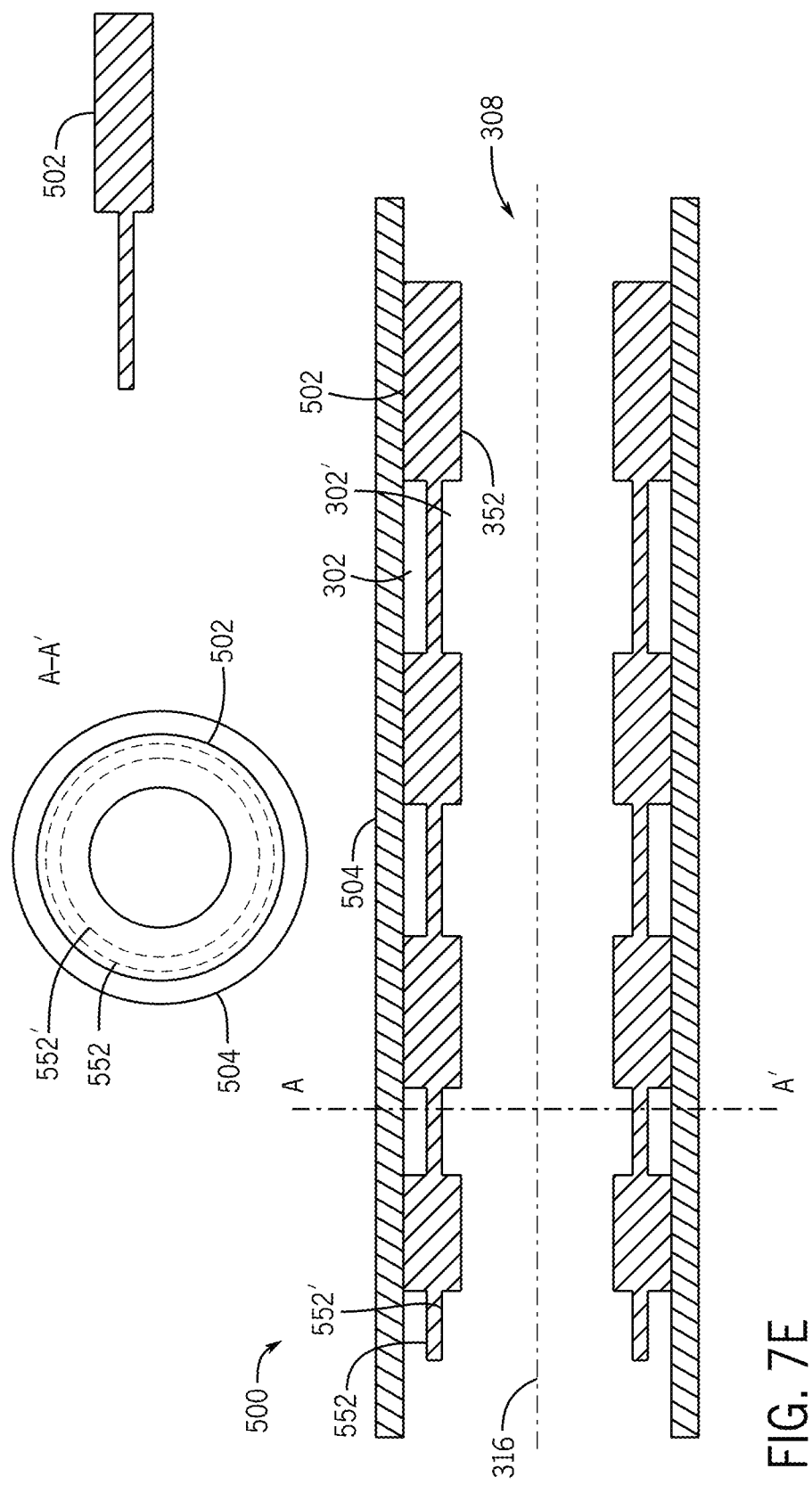

FIG. 7E illustrates a cross-sectional side view of an embodiment of the isolator 500 which is a combination of the principles illustrated by FIGS. 5C and 7C. In the arrangement of FIG. 7E, the rings 502 have a particular profile leading to middle cut isolator features 302 as well as to inner cut isolator features 302'. The particular profile of rings 502 provides for two steps 552 and 552' that correspond to the desired step of acoustic impedances. By joining the rings 502 together, and installing them in tubular 504, bore 308 is created with an inner surface 352 of isolator 500 that has recesses or grooves corresponding to inner cut isolator features 302'. Fastener elements, such as fastener rings 570 in FIG. 5C may be coupled (e.g. screwed) to tubular 504, such that tubular 504, rings 502 and fastener elements will be held together.

Figure 8:
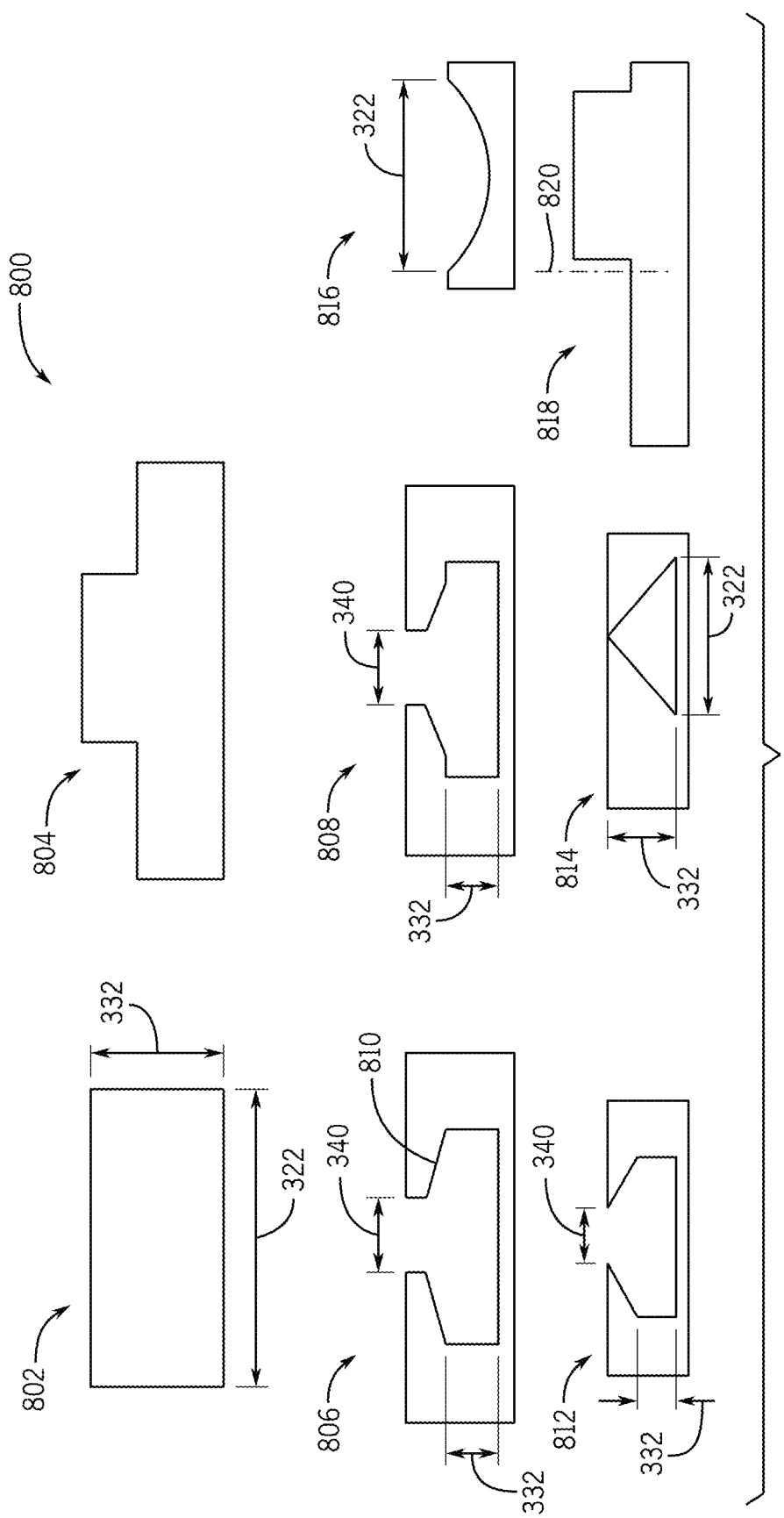
FIG. 8 is a schematic cross-sectional view of isolator features, in accordance with embodiments of the present disclosure.

FIG. 8 illustrates cross-sectional views of a variety of shapes that may be utilized for cuts 800. It should be appreciated that these are provided by way of example only and are not intended to limit the scope of the present disclosure, as various modifications may be applied to the cuts. Furthermore, one or more may be utilized as either inner cuts, mid cuts, or outer cuts. A first cut 802 is rectangular and includes the axial length 322 and the axial section thickness 332. It should be appreciated that the length 322 and axial section thickness 332 may be equal to form a square or may be different. A second cut 804 corresponds to the T-shaped cut, such as the cut illustrated in FIGS. 3A-4B. A third cut 806 and fourth cut 808 correspond to a winged or slanted cut profile that includes slanted portions 810 at the opening 702. These slanted portions 810 provide a different shape compared to the second cut 804, but may stilled be referred to as having a generally T-shape in one or more embodiments. Fourth and fifth cuts 812, 814 correspond to trapeze-like shape and triangle shapes, respectively. Seventh cut 816 corresponds to an elliptical shape, as noted above. Eighth cut 818 illustrates an example of a non-symmetrical cut, as noted above. In this example, a cut axis 820 is shown extending in a radial direction (e.g., relative to the arrangement of the cut with respect to the tool axis). The illustrated radial section 320 is shown as asymmetric relative to the cut axis 820. It should be appreciated that the asymmetry of the eighth cut 818 is shown as only an example, an there may be asymmetry across an axis perpendicular to the cut axis 820, for example, the illustrated T-shaped cuts in various embodiments illustrate such asymmetry. One or more of the dimensions with respect to these cuts 800, or any other cut described herein, may be particularly selected based on operating conditions (e.g. borehole size, bending moment, wellbore trajectory, transmitted frequency of acoustic source 110), and as a result, may adjust a general shape to make various features skewed or otherwise different shaped than as illustrated in FIG. 8. Additionally, the different cuts 800 may be mixed and utilized within a singular design in order to change one or more properties of the collar.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:
1. An acoustic logging tool for a wellbore, comprising:
an acoustic source for generating one or more acoustic waves;
an acoustic receiver for receiving at least a portion of or a reflection of the one or more acoustic waves; and an isolator, comprising:
- a housing having an outer housing surface;
- a bore defined within the housing and configured to conduct a drilling fluid through the isolator, the bore having an outer bore surface; and
- a first isolator feature positioned between the outer housing surface and the outer bore surface such that the first isolator feature is physically separated from the bore and the outer housing surface, the first isolator feature configured to reduce a collar wave transmitted by the acoustic source.

2. The acoustic logging tool of claim 1, further comprising:
- a second isolator feature positioned between the outer housing surface and the outer bore surface, the second isolator feature configured to reduce the collar wave transmitted by the acoustic source.

3. The acoustic logging tool of claim 2, wherein the first and second isolator features have different sizes.

4. The acoustic logging tool of claim 1, wherein the housing comprises:
- a ring segment, the ring segment forming the first isolator feature.

5. The acoustic logging tool of claim 2, wherein the housing comprises:
- a first ring segment, the first ring segment forming the first isolator feature; and
- a second ring segment, the second ring segment forming the second isolator feature.

6. The acoustic logging tool of claim 5, wherein at least one of the first ring segment and the second ring segment covers a full revolution about a longitudinal axis of the isolator.

7. The acoustic logging tool of claim 5, wherein the first ring segment and the second ring segment are coupled by an anti-rotation device to restrict rotational movement of the first ring segment relative to the second ring segment.

8. The acoustic logging tool of claim 1, wherein the first isolator feature is sealed against the drilling fluid in the bore.

9. The acoustic logging tool of claim 5, wherein the first and second ring segments further comprise:
- a fluid conduit to allow pressure exchange between the first and second isolator features.

10. The acoustic logging tool of claim 1, wherein the first isolator feature is "T" shaped.

11. The acoustic logging tool of claim 5, further comprising:
- a liner tube, the liner tube forming the outer bore surface.

12. The acoustic logging tool of claim 5, wherein the first ring segment and the second ring segment are connected by a threaded connection.

13. A method for logging a wellbore, comprising:
positioning an acoustic logging tool within the wellbore, the acoustic logging tool comprising:
- an acoustic source for generating one or more acoustic waves;
- an acoustic receiver for receiving at least a portion of or a reflection of the one or more acoustic waves; and
- an isolator, comprising:
  - a housing having an outer housing surface;
  - a bore defined within the housing and configured to conduct a drilling fluid through the isolator, the bore having an outer bore surface; and
  - a first isolator feature positioned between the outer housing surface and the outer bore surface such that the first isolator feature is physically separated from the bore and the outer housing surface, the first isolator feature configured to reduce a collar wave transmitted by the acoustic source;

emitting the one or more acoustic waves, using the acoustic source; and
receiving, via the acoustic receiver, acoustic data corresponding to the one or more acoustic waves.

14. The method of claim 13, further comprising:
installing, within the acoustic logging tool, a first ring segment, the first ring segment forming the first isolator feature.

15. The method of claim 14, wherein the isolator further comprises a second isolator feature positioned between the outer housing surface and the outer bore surface, the second isolator feature configured to reduce the collar wave transmitted by the acoustic source, the method further comprising:
installing, within the acoustic logging tool, a second ring segment, the second ring segment forming the second isolator feature.

16. The method of claim 15, wherein at least one of the first ring segment and the second ring segment covers a full revolution about a longitudinal axis of the isolator.

17. The method of claim 15, further comprising:
installing an anti-rotation device between the first ring segment and the second ring segment to restrict rotational movement of the first ring segment relative to the second ring segment.

18. The method of claim 17, further comprising:
installing a seal configured to seal the isolator feature against the drilling fluid in the bore.

19. The method of claim 15, further comprising:
allowing pressure exchange between the first and second isolator features by a fluid conduit in at least one of the first and second ring segments.

20. The method of claim 13, wherein the first isolator feature is "T" shaped.

* * * * *